United States Patent [19]

Breda et al.

[11] Patent Number: 5,252,024
[45] Date of Patent: Oct. 12, 1993

[54] TRANSFER METHOD FOR VARIOUS SIZES OF ASSEMBLIES

[75] Inventors: Michael A. Breda, East Amherst; George K. Snyder; Peter A. Lyon, both of Lockport, all of N.Y.

[73] Assignee: General Motors Corporation, Detroit, Mich.

[21] Appl. No.: 787,179

[22] Filed: Nov. 4, 1991

[51] Int. Cl.⁵ .............................................. B65G 57/03
[52] U.S. Cl. .................................. 414/786; 414/799; 414/225
[58] Field of Search ................. 901/35, 47; 414/792.9, 414/790.2, 751, 273, 730, 790, 794, 786; 294/103.1, 119.1

[56] References Cited

U.S. PATENT DOCUMENTS

| | | | |
|---|---|---|---|
| 2,936,192 | 5/1960 | Lince | 294/103.1 |
| 3,884,363 | 5/1975 | Ajloury | 414/626 |
| 4,238,169 | 12/1980 | DePriester et al. | 294/103.1 |
| 4,256,429 | 3/1981 | Dwyer | 294/119.1 |
| 4,400,124 | 8/1983 | Greller | 414/790.2 |
| 4,746,255 | 5/1988 | Roccabianca et al. | 414/792.9 |
| 4,786,229 | 11/1988 | Henderson | 414/799 |
| 4,844,680 | 7/1989 | Kawata et al. | 414/282 |
| 4,860,421 | 8/1989 | Breda et al. | 29/157.3 A |
| 4,929,144 | 5/1990 | Fraser | 414/799 |
| 5,088,783 | 2/1992 | Squires | 414/626 |
| 5,088,877 | 2/1992 | Henk | 414/790 |
| 5,120,189 | 6/1992 | Breda | 414/786 |

Primary Examiner—Michael S. Huppert
Assistant Examiner—Gregory A. Morse
Attorney, Agent, or Firm—Ronald L. Phillips

[57] ABSTRACT

A loose assembly of parts which are not secured is moved from a pallet on a conveyor to a banding station. The assembly may vary in size and a machine readable tag on the pallet bears the size information. A transfer apparatus reads the tag and adjusts a clamp size to fit the assembly. An elevator lifts the assembly from the pallet to the clamp and guide fingers hold the assembly together during the transit. The clamp is suspended from an overhead trolley which carries the clamp and assembly to the banding station where the assembly is released. A lift cylinder on the trolley raises the clamp to clear the assembly and the clamp is then returned to its position above the conveyor, lowered, and adjusted to receive another assembly.

1 Claim, 4 Drawing Sheets

TRANSFER METHOD FOR VARIOUS SIZES OF ASSEMBLIES

FIELD OF THE INVENTION

This invention relates to the transfer of various sizes of assemblies of unsecured parts during manufacture from one station to another and particularly to a method and apparatus for such transfer.

BACKGROUND OF THE INVENTION

In the manufacture of air conditioner evaporator cores pairs of mating plates are assembled with air centers or corrugated fins between the pairs of plates. When these parts are brazed together the pairs of plates then become freon tubes in good heat transfer relation with the fins. Handling the loose parts as an unsecured assembly before the brazing step requires some special equipment. Certain related models of cores differ only in the number of pairs of plates in the assembly and are conveniently assembled on the same line. It is necessary then for the handling equipment and methods to automatically accommodate the different sized assemblies.

When it is realized that high production volumes and thus high rates, perhaps on the order of more than six parts per minute, are required, the equipment must be very reliable and durable as well as fast acting. Thus automatic adjustments for different assembly sizes is desirable to avoid down time for manual adjustments. The automatic adjustment makes possible running small batches of each size evaporator core.

In particular, U.S. Pat. No. 4,860,421 to Breda et al. entitled "Method for Assembling Plate Type Heat Exchangers" discloses an arrangement for assembling the plates and fins using a pallet comprising a plurality of plastic blocks adjustably slidable on longitudinal rods, the blocks holding the pairs of plates and the intervening fins. As further shown in the patent, the assembly system has a power and free conveyor following an oval path which includes several assembly stations where the heat exchanger core is built in the pallet, a transfer station where the assembled core is transferred to a banding conveyor for the purpose of adding brazing fixtures and banding the assembly, and a brazing station where the core elements are joined by brazing. The present invention deals with the transfer station for transferring the core to the banding conveyor.

SUMMARY OF THE INVENTION

It is therefore an object of the invention to provide a method and apparatus for reliably removing a loose assembly of parts comprising a core from a pallet and transferring it to another station Another object is to provide in such a method and apparatus the ability to automatically adjust to the size of each core being transferred.

The invention is carried out in an apparatus for removing various sizes of assemblies of unsecured parts from pallets holding the parts at a transfer station and moving the parts to a receiving station; by the method of transferring an assembly comprising the steps of: detecting the size of the assembly; adjusting a clamp to fit the detected size; moving the assembly from the pallet to the clamp and restraining the assembly during such moving to maintain its integrity; closing the clamp against the assembly to hold the parts together; and moving the clamp and the assembly to the receiving station.

The invention is further carried out by apparatus for transferring an unsecured assembly of parts from a pallet holding the parts from a pallet conveyor to a receiving station comprising a mount movably supported above the pallet conveyor for shuttling between the pallet conveyor and the receiving station; adjustable clamp means carried by the mount and positioned above the pallet; means for loading the clamp means by lifting the assembly from the pallet to the clamp means for holding engagement by the clamp means; guide means for confining the parts in assembled condition between the pallet and the clamp means; and means for moving the mount and the clamp means when loaded to the receiving station.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

Figure 1:
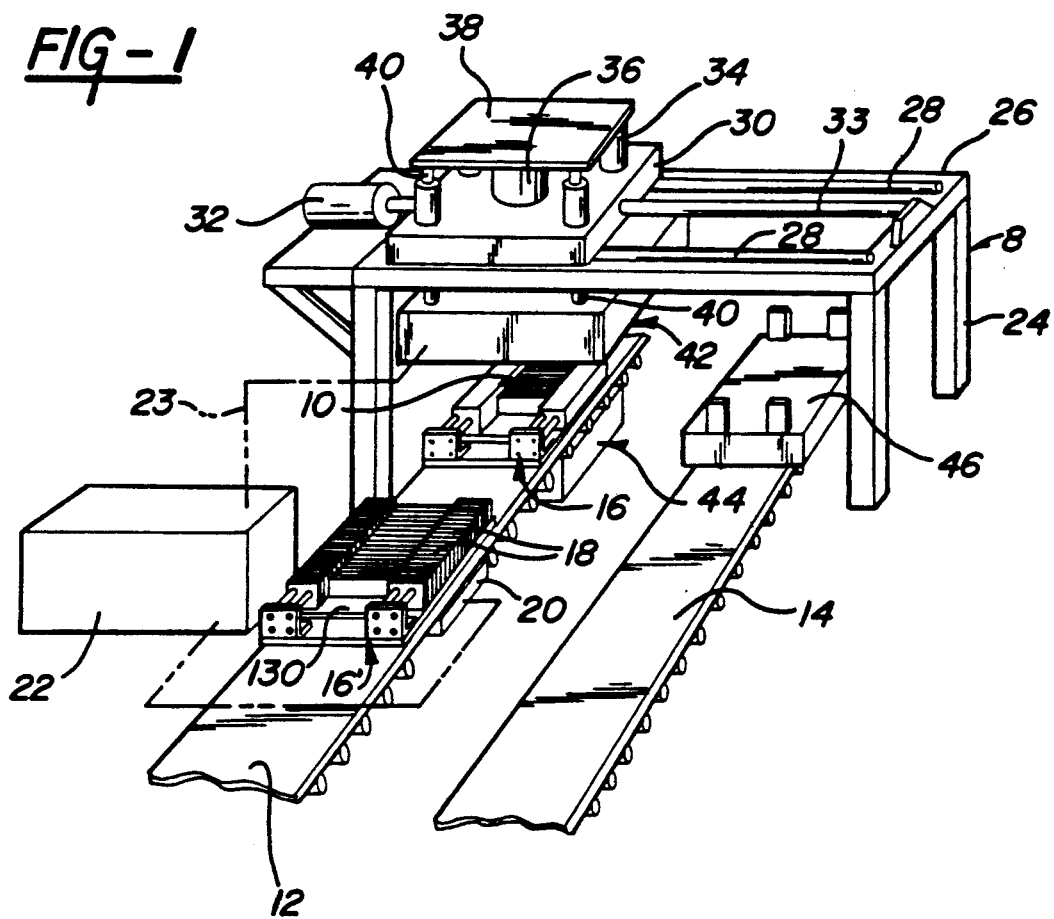
FIG. 1 is a schematic diagram of transfer apparatus according to the invention.

In the manufacture of an evaporator core, the elements of the core are first loosely assembled and later banded for a subsequent brazing operation. In the meantime the loose assembly is transferred from pallets to a banding conveyor FIG. 1 shows a transfer apparatus 8 for moving an assembly 10 of unsecured parts from a first conveyor 12 to a banding conveyor 14. The first conveyor carries pallets 16, each holding an assembly 10, through a succession of stages (not shown) where the assembly is built up by adding parts to the pallets 16, the parts not, as yet, being secured to one another but held together only by guide blocks 18 of the pallets. The size of each assembly depends on the number of elements inserted into the pallet. A machine readable tag or label on each pallet determines the size of each assembly. Before entering the transfer apparatus 8 each pallet passes over a tag reader 20 to glean the size data which is transmitted to a microcomputer based controller 22. The controller 22 then can signal the transfer apparatus via line 23 to prepare for the correct assembly size.

The transfer apparatus 8 includes a superstructure 24 which straddles the conveyors 12 and 14. Overhead beams 26 support a pair of horizontal rails 28 extending transversely of the conveyors. A trolley 30 rides on the rails 28 and shuttles back and forth between respective spaces above the first conveyor 12 and the banding conveyor 14. A motor 32 and drive shaft 33 propel the trolley 30. The trolley is generally rectangular and has a vertical guide tube 34 at each corner and a central lift cylinder 36 supporting an upper cross member 38. Four vertical posts 40 carried by the cross member 38 are guided in the tubes 34 and support a transfer head 42 beneath the rails 28. The lift cylinder 36 is thus effective to move the cross member 38 and the transfer head 42 between lower and upper positions. An elevator unit 44 beneath the conveyor 12 is effective to lift the assembly 10 from the pallet 16 to the transfer head 42, which is in its normal or lower position directly above the elevator unit 44. The overall operation of the transfer head 42 is to receive the assembly 10, translate horizontally under control of the motor 32 to position the assembly 10 over a receiving station 46 on the banding conveyor 14, unload the assembly 10 at the receiving station, lift to its upper position to clear the assembly, translate back to the conveyor 12 and move down to the lower position in readiness to repeat the cycle.

Figure 2:
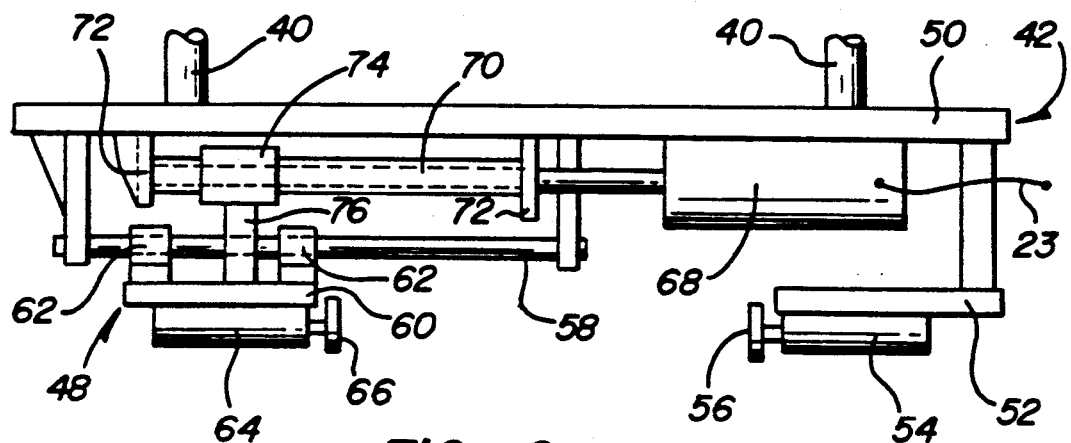
FIG. 2 is a view of a portion of the transfer apparatus showing an adjustable clamp according to the invention.

FIG. 2 shows an adjustable clamp 48 on the transfer head 42. Many elements are omitted from this view for the sake of clarity. A main support 50 of the transfer head 42 which is suspended by the posts 40 holds a stationary lower support plate 52. A double acting cylinder 54 is mounted beneath the support plate 52 and actuates a first clamp jaw 56 a short distance, say, an inch or so; otherwise the jaw 56 is fixed. A pair of horizontal linear bearing shafts 58 hung beneath the main support 50 hold a movable support plate 60 which is slidably attached to the shafts 58 by bearing guides 62. A second double acting cylinder 64 is mounted beneath the support plate 60 and actuates a second clamp jaw 66 to move a short distance. The second clamp jaw 66 is opposed to the first jaw 56 and is movable a large distance, say several inches, as the guides 62 slide on the shafts 58. A servomotor 68 mounted under the main support 50 has a shaft which is drivingly connected to the end of a lead screw 70 which is carried in journals 72 attached to the under surface of the main support 50. A nut 74 on the lead screw travels along the screw in either direction according to the rotation of servomotor 68, and engages the movable support plate 60 through a coupling 76. The servomotor 68 is under control of the controller 22 via line 23 so that the position of jaw 66 and thus the clamp size can be adjusted by the controller to suit the size of the incoming assembly 10.

Figure 3:
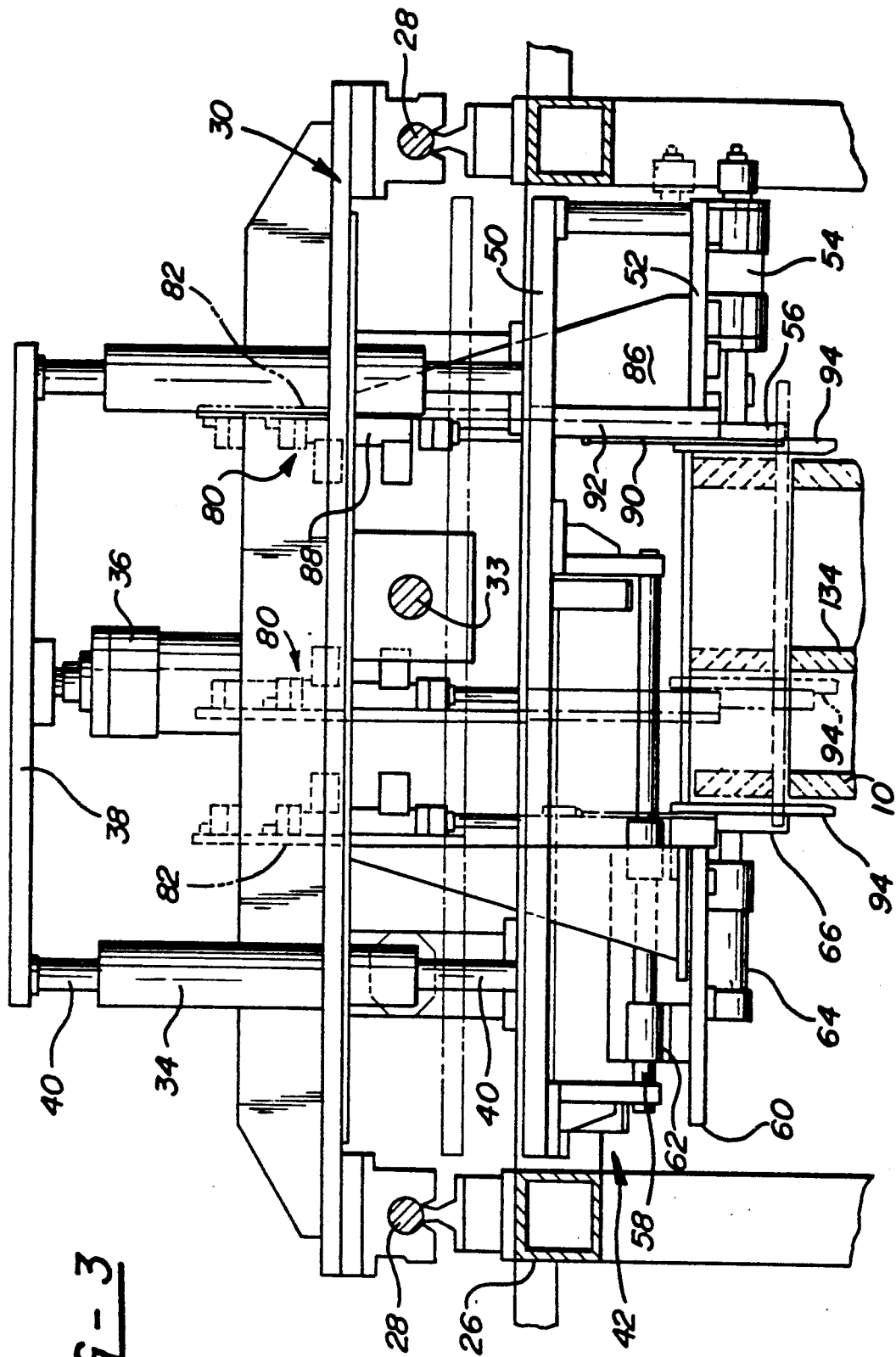
FIGS. 3 and 4 are front and cross-sectional views of the transfer head of the apparatus of FIG. 1.
Figure 4:
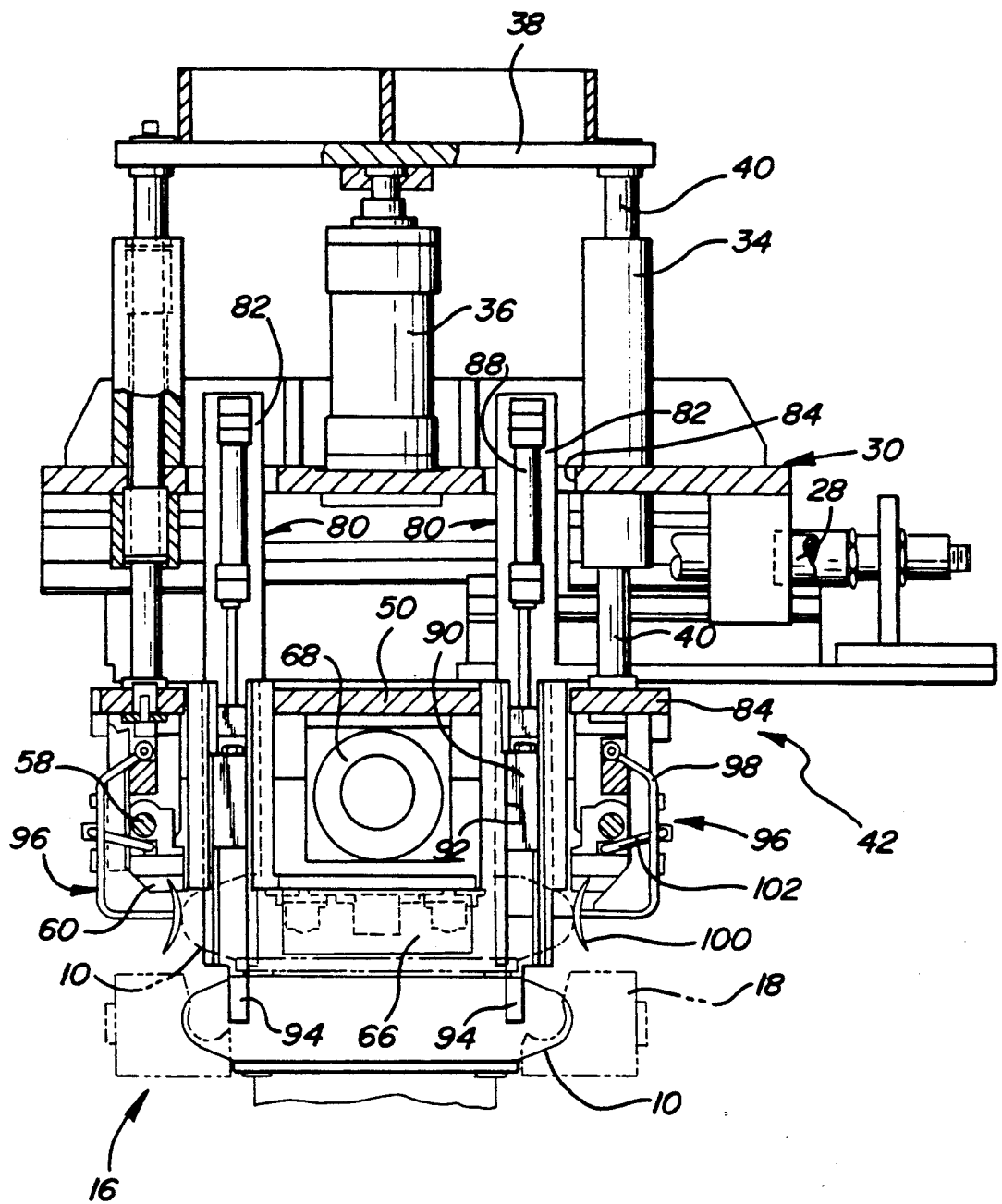

FIGS. 3 and 4 are a side view and a transverse cross section of the trolley 30 and transfer head 42 portions of the apparatus showing more details of those portions. The stationary support plate 52 and the movable support plate 60 each support a pair of guide finger assemblies 80. Each guide finger assembly includes a long upright 82 extending through apertures 84 in the main support 50 and the trolley 30 and braced by a bracket 86. A double acting cylinder 88 near the top of each upright 82 is attached to a slide 90 which slides in a way 92 near the bottom of the upright for up and down movement according to the cylinder actuation. A guide finger 94 on each slide is located to one side of one of the clamp jaws 56, 66 and extends in its lowest position into the pallet 16 adjacent an end of the assembly 10 so that all together two guide fingers can be positioned at or near each end of the assembly 10 when it is in the pallet to serve as guides when the assembly is lifted from the pallet. When retracted to the upper position the guide fingers 94 do not protrude below the clamp jaws. The pair of guide finger assemblies 80 supported on the movable support plate 60 move with the plate so that the guide fingers are adjusted to the size of the assembly 10 just as the clamp is so adjusted. When the clamp jaws 56, 66 are retracted they lie behind the inboard faces of the adjacent guide fingers 94 to avoid interference with the assembly when it is being introduced to the clamp region; when the jaws are extended to hold the assembly they will be in front of the fingers 94.

As shown in FIG. 4, a spring loaded guide 96 is pivotally supported from each side of the main support 50 and comprises a lever arm 98 pivoted at its upper end carrying a curved guide shoe 100 at its lower end, the shoe being positioned to touch the assembly 10 when loaded into the clamp. A coil spring 102 connected between the lever arm 98 and a ground biases the shoe 100 toward the assembly, so that the assembly engages a shoe at each end.

Figure 5:
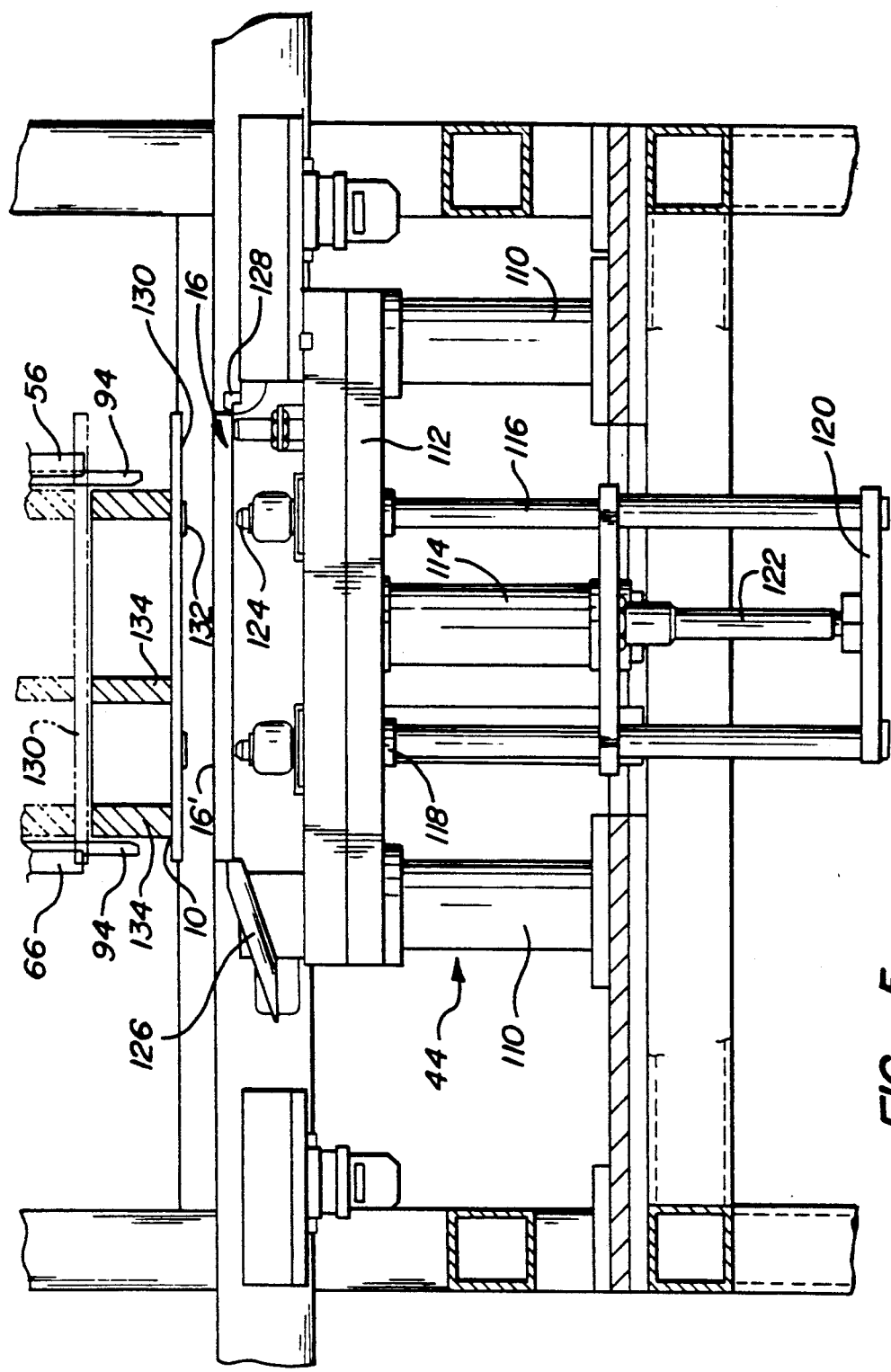
FIG. 5 is a side view of an elevator unit of the apparatus of FIG. 1.

FIG. 5 shows the elevator unit 44 which resides below the level of the conveyor 12. Supports 110 hold a cross member 112 which, in turn, supports an actuating cylinder 114 on its lower surface. Four lift rods 116 arrayed around the cylinder 114 are slidably carried in guide bushings 118 passing through the cross member 112. A lower plate 120 joins the lower ends of the lift rods 116 and the actuating shaft 122 of the cylinder 114 so that the cylinder can move the lift rods 116 vertically. The upper end of the lift rods 116 are fitted with diamond shaped locating tips 124. The cross member supports on it upper surface a latch 126 to prevent back travel of a pallet 16 in the station and a releasable latch 128 holds the pallet against forward movement The pallet 16 is represented in this view by the bottom frame plate 16' which has openings allowing the lift rods to pass through the plate. A lift plate 130 which is a removable part of the pallet 16 and helps support the elements of the assembly has locating pads 132 on its bottom surface which contain indentations for positive engagement by the locating tips 124. The assembly 10 is shown having a right end adjacent the right guide finger 94 and a left end 134, indicated by hatching, which is variable in location according to the assembly size. That is, when the assembly is built, it always has one end at a given point on the downstream end of the pallet, while the other end may vary in pallet location. With the clamp jaws 56, 66 properly adjusted and the guide fingers 94 lowered alongside the assembly 10, the cylinder 114 raises the lift rods 116 which engage the lift plate 130 to lift the assembly 10 from the pallet 16 and load the assembly into the clamp jaws, the guide fingers also being raised when they are pushed up by the lift plate 130.

In operation, when a pallet 16 on the conveyor 12 passes over the tag reader 20 the assembly size data is read and furnished to the controller 22 where it is saved until the transfer head 42 has discharged the previous assembly, and then the controller operates the servomotor 68 to position the movable jaw 66 of the adjustable clamp 48 to adjust the clamp size for the incoming assembly Of course, the guide finger 94 carried by support plate 60 is positioned along with the clamp 66. When the pallet 16 enters the transfer station and is latched into position, and the transfer head 42 is in its lower position just above the pallet, the cylinders 82 are pressurized to extend the guide fingers 94 to locations at either end of the assembly 10. The cylinder 114 in the elevator unit 44 is actuated to elevate the lift rods 116 which engage the lift plate 130 which, in turn, lifts the assembly 10 from the pallet and into the clamp 48. The guide fingers loosely contact the ends of the assembly 10 to keep the assembly together during the transit from the pallet to the clamp. The pressure in the cylinders 82 is reduced so that when the lift plate engages the guide fingers during its upward travel, the guide fingers 94 will be pushed up also. As the assembly 10 is loaded into the clamp, the spring loaded guides 96 embrace the assembly by contacting both sides to help maintain alignment of the assembly parts. Then the clamp cylinders 54 and 64 are pressurized to push the clamp jaws 56, 66 into engagement with the ends of the assembly to securely hold the assembly 10 and the cylinders 82 are actuated to withdraw the guide fingers upwardly. The motor 32 is operated to translate the trolley 30 and transfer head to the banding conveyor 14 region where the cylinders 54, 64 retract the clamp jaws 56, 66 to release the assembly to the receiving station 46. The transfer head is then raised by the lift cylinder 36 to clear the assembly at the receiving station, translated back to the transfer station, and lowered to its normal position to repeat the cycle.

The embodiments of the invention in which an exclusive property or privilege is claimed are defined as follows:

1. A method of transferring an assembly of unsecured parts in an apparatus for removing various sizes of assemblies of unsecured parts from pallets holding the parts at a transfer station and moving the parts to a receiving station; the method comprising the steps of:
providing machine readable information containing size data on the pallet carrying the assembly,
reading the information to determine the assembly size,
adjusting a clamp to fit the detected size,
moving the assembly from the pallet to the clamp and restraining the assembly during such moving to maintain its integrity,
closing the clamp against the assembly to hold the parts together, and
moving the clamp and the assembly to the receiving station.

* * * * *